United States Patent
Pfeiffer et al.

(10) Patent No.: US 7,165,303 B2
(45) Date of Patent: Jan. 23, 2007

(54) DISC CASSETTE DELIDDER AND FEEDER SYSTEM FOR DATA STORAGE DEVICES

(75) Inventors: Michael W. Pfeiffer, Savage, MN (US); Eric D. Johnson, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 172 days.

(21) Appl. No.: 10/743,684

(22) Filed: Dec. 15, 2003

(65) Prior Publication Data

US 2004/0136818 A1    Jul. 15, 2004

Related U.S. Application Data

(60) Provisional application No. 60/433,714, filed on Dec. 16, 2002.

(51) Int. Cl.
*B21D 39/03* (2006.01)
*B65B 21/02* (2006.01)

(52) U.S. Cl. .................. 29/429; 29/428; 414/411
(58) Field of Classification Search .............. 29/429, 29/428, 426.1, 426.3, 822, 281.1; 360/69; 414/411, 331.13, 331.09
See application file for complete search history.

(56) References Cited

U.S. PATENT DOCUMENTS

| | | | |
|---|---|---|---|
| 5,525,024 A | 6/1996 | Freerks et al. | |
| 5,538,385 A | 7/1996 | Bacchi et al. | |
| 5,664,926 A | 9/1997 | Sussman et al. | |
| 5,697,759 A | 12/1997 | Bacchi et al. | |
| 5,857,827 A | 1/1999 | Asakawa et al. | |
| 5,931,631 A | 8/1999 | Bonora et al. | |
| 5,947,675 A | 9/1999 | Matsushima | |
| 5,947,677 A | 9/1999 | Matsushima et al. | |
| 5,971,696 A | 10/1999 | Endo et al. | |
| 6,033,521 A | 3/2000 | Allen et al. | |
| 6,060,721 A | 5/2000 | Huang | |
| 6,135,698 A | 10/2000 | Bonora et al. | |
| 6,138,721 A | 10/2000 | Bonora et al. | |
| 6,142,723 A | 11/2000 | Kang | |
| 6,152,680 A | 11/2000 | Howells et al. | |
| 6,190,118 B1 | 2/2001 | Allen et al. | |
| 6,223,886 B1 | 5/2001 | Bonora et al. | |
| 6,318,944 B1 | 11/2001 | Shimeno et al. | |
| 6,409,448 B1 | 6/2002 | Sindledecker | |
| 6,443,686 B1 | 9/2002 | Wiesler et al. | |
| 6,461,094 B1 | 10/2002 | Mages et al. | |
| 6,471,460 B1 * | 10/2002 | Pedersen et al. ........ | 414/222.09 |
| 2002/0009357 A1 | 1/2002 | Hanson et al. | |

(Continued)

*Primary Examiner*—John C. Hong
(74) *Attorney, Agent, or Firm*—Fellers, Snider, et al.

(57) ABSTRACT

A disc cassette delidder and feeder system that includes a frame supporting; a feed-in conveyor with a movable conveyor portion, a delidder assembly attached to a lid elevator, a caddy grip and rotate assembly secured to a caddy elevator, and a re-lid assembly portion of an out-feed conveyor. The feed-in conveyor advances a disc cassette with a caddy portion confining a disc to the delidder assembly, the delidder assembly removes a lid portion of the disc cassette, the caddy grip and rotate assembly secures and rotationally aligns the caddy portion for removal of the disc, the caddy elevator indexes the caddy portion to finally present the disc for removal from the caddy portion, and the re-lid assembly confines the caddy portion while the delidder assembly rejoins the lid portion to the caddy portion.

19 Claims, 3 Drawing Sheets

U.S. PATENT DOCUMENTS

| | | |
|---|---|---|
| 2002/0071744 A1 | 6/2002 | Bachrach |
| 2002/0150449 A1 | 10/2002 | Nelson et al. |
| 2002/0164232 A1 | 11/2002 | Davis et al. |
| 2004/0175258 A1* | 9/2004 | Haas .......................... 414/273 |

* cited by examiner

DISC CASSETTE DELIDDER AND FEEDER SYSTEM FOR DATA STORAGE DEVICES

RELATED APPLICATIONS

This application claims priority to U.S. Provisional Application No. 60/433,714 filed Dec. 16, 2002, entitled Disc Cassette Delider and Feeder System.

FIELD OF THE INVENTION

This invention relates generally to the field of magnetic data storage devices, and more particularly, but not by way of limitation, to a disc cassette delidder and feeder system for use in presenting data storage discs during data storage device assembly operations.

BACKGROUND

One key component of many electronic devices is an apparatus, (such as a data storage device) to store data. The most basic parts of a data storage device are at least one information storage disc that is rotated, an actuator that moves a read/write head (head) to various locations over substantially concentric data tracks of the disc, and electrical circuitry used for encoding data so that the data can be successfully retrieved and written to the disc surface. A microprocessor controls most of the operations of the disc drive including exchanging data between the computer system and the data storage device.

Among the challenges associated with data storage devices and data storage device assembly processes are cost effective techniques for the presentation of the information storage disc during the assembly process. To minimize the exposure of information storage discs to contaminants and handling damage during the production process, it has been found useful to contain the discs within the disc shipping cassettes. However, under prior production processes, an operator would prepare the disc shipping cassettes for use in the production process by delidding the cassette and positioning the cassette for use. At times operators would prematurely delid the cassettes, or cause an untimely delay in the supply of the information storage discs, or mishandle the cassettes during the delidding operation causing damage to the information discs, or fail to replace the lid on empty cassette caddies, or damage either the lid or the caddy while replacing the lid on the caddy.

As such, challenges remain and a need persists for cost effective techniques for managing the material handling functions associated with the presentation of information storage discs, for use during assembly operations of data storage devices.

SUMMARY OF THE INVENTION

In accordance with preferred embodiments, a method, apparatus and combination are provided for presenting a disc for attachment to a motor of a data storage device. The combination includes a motor assembly rotating a disc into a data exchange relationship with a read/write head, wherein the disc is presented for attachment to the motor assembly by steps for presenting a disc executed by means for presenting a disc.

In one embodiment, the method preferably includes advancing a disc cassette with a caddy portion confining the disc to a delidder assembly for removal of a lid portion from the caddy portion of the disc cassette by the delidder assembly. Preferentially, the method continues with, rotating the caddy portion with a grip and rotate assembly from a substantially horizontal orientation to a substantially vertical orientation, and indexing the caddy portion with a caddy elevator to position the disc for presentation. The disc is indexed into a final presentation position by the caddy elevator indexing the caddy portion.

In another embodiment, the apparatus is preferably a frame supporting a feed-in conveyor that advances a disc cassette with a caddy portion confining a disc, and a delidder assembly communicating with the feed-in conveyor that removes a lid portion of the disc cassette from the caddy portion of the disc cassette. The apparatus further includes a caddy elevator with an attached grip and rotate assembly supported by the frame, which rotates and indexes the caddy portion for presentation of the disc, and a re-lid assembly adjacent the caddy elevator confining the caddy portion while the delidder assembly rejoins the lid portion to the caddy portion.

These and various other features and advantages that characterize the claimed invention will be apparent upon reading the following detailed description and upon review of the associated drawings.

DETAILED DESCRIPTION

Figure 1:
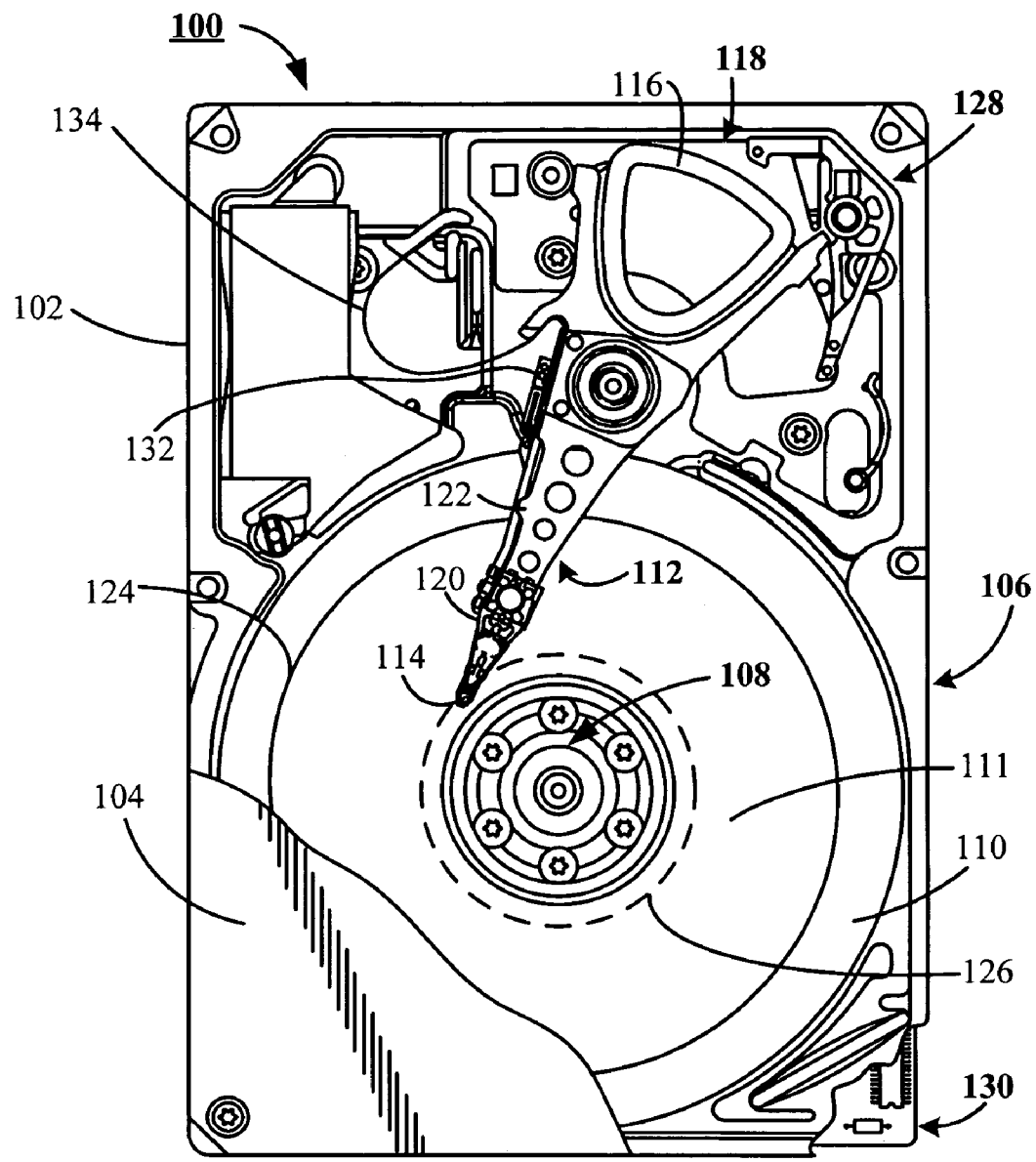
FIG. 1 is a partial cutaway top plan view of a data storage device (DSD) that incorporates discs provided by a disc cassette delidder and feeder system of the present invention.

Referring now to the drawings, FIG. 1 provides a top plan view of a data storage device (DSD) 100. The DSD 100 includes a base deck 102 cooperating with a top cover 104 (shown in partial cutaway) to form a sealed housing for a mechanical portion of the DSD 100, referred to as a head-disc assembly (HDA) 106.

A spindle motor assembly (motor) 108 rotates a number of data storage discs 110 with a magnetic recording surface (surfaces) 111 at a substantially constant operational speed. An actuator assembly (actuator) 112 supports and rotates a number of read/write heads (heads) 114 into a data exchange relationship adjacent the magnetic recording surfaces 111 when current is applied to a coil 116 of a voice coil motor (VCM) 118. A head suspension 120 provides a predetermined spring force on the head 114 to maintain the proper data exchange relationship between the head 114 and the disc 110 during operation of the DSD 100. Additionally, the head suspension 120 serves to connect the head 114 with an actuator arm 122 of the actuator 112.

During operation of the DSD 100, the actuator 112 moves the heads 114 into the data exchange relationship with the disc 110, i.e., the actuator 112 moves the heads to data tracks 124 on the surfaces 111 to write data to and read data from the discs 110. When the DSD 100 is deactivated, the actuator 112 positions the heads 114 adjacent a home position 126 and the actuator 112 is confined by latching a toggle latch 128.

Command, control and interface electronics for the DSD 100 are provided on a printed circuit board assembly 130 mounted to the HDA 106. During data transfer operations, a preamplifier/driver (preamp) 132 attached to a flex circuit 134 conditions read/write signals conducted by the flex circuit 134 between the printed circuit board assembly 130 and the heads 114.

Figure 2:
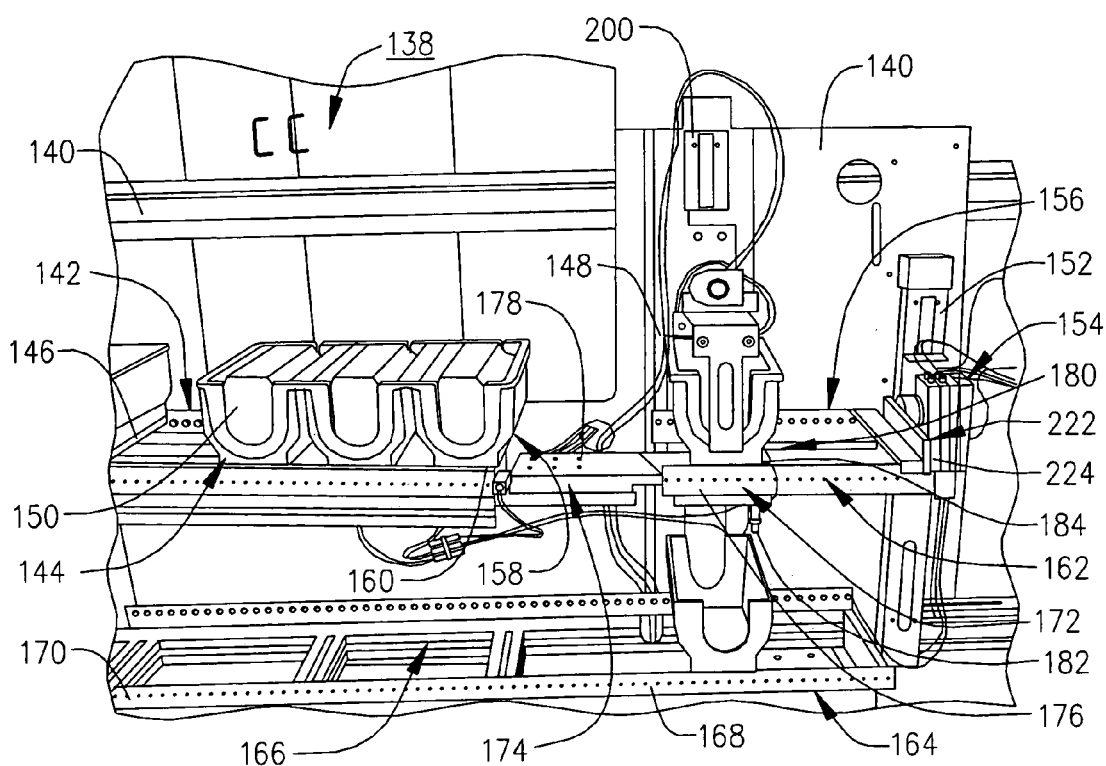
FIG. 2 is a first elevational perspective view of the disc cassette delidder and feeder system used during the assembly process of the DSD of FIG. 1.

FIG. 2 shows that a disc cassette delidder and feeder system 138 of a preferred embodiment, used during the assembly process of the HDA 106 (of FIG. 1), includes a frame 140 supporting a feed-in conveyor 142 that advances a disc cassette 144 with a caddy portion 146 confining the disc 110 (of FIG. 1). The disc cassette 144 is oriented in a substantially horizontal orientation relative to the feed-in conveyor 142. A delidder assembly 148 communicating with the feed-in conveyor 142 removes a lid portion 150 of the disc cassette 144 from the caddy portion 146 of the disc cassette 144, and a caddy elevator 152 with an attached grip and rotate assembly 154 rotates and indexes the caddy portion 146 to present the disc 110 for assembly into the HDA 106.

The caddy elevator 152 is supported by the frame 140, while the grip and rotate assembly 154 is attached to the caddy elevator 152. The grip and rotate assembly 154 engages and secures the caddy portion 146 when the caddy portion 146 is transferred to a staging conveyor section 156. The feed-in conveyor 142 includes a first gating device 158 working in tandem with an electronic sensor 160 to facilitate advancement of not more than one disc cassette 144 onto a sliding conveyor 172 (discussed below).

Upon engagement of the caddy portion 146 by the grip and rotate assembly 154; the caddy elevator 152 raises the caddy portion 146 off of the staging conveyor section 156 to a caddy clearance position (not separately shown) above the staging conveyor section 156; the grip and rotate assembly 154 rotates the caddy portion 146 from the substantially horizontal orientation to a substantially vertical orientation; and the caddy elevator 152 lowers the caddy portion 146 between opposing rails 162 of the staging conveyor section 156 by indexing the caddy portion 146 into a proper vertical location for presentation of the disc 110.

Additionally, FIG. 2 shows a preferred embodiment of a re-lid assembly 164 adjacent the caddy elevator 152 confining the caddy portion 146 while the delidder assembly 148 rejoins the lid portion 150 to the caddy portion 146. Preferably, adjacent the re-lid assembly 164 is an out-feed conveyor 166 with a proximal end 168 communicating with the re-lid assembly 164. The out-feed conveyor 166 transfers the caddy portion 146 rejoined with the lid portion 150 from the re-lid assembly to a distal end 170 of the out-feed conveyor 166.

The sliding conveyor assembly 172 communicates with the feed-in conveyor 142 to support and shuttle disc cassettes 144 between the feed-in conveyor 142 and the delidder assembly 148. Additionally, the sliding conveyor assembly 172 preferably positions and secures the disc cassette 144 relative to the delidder assembly 148 for removal of the lid portion 150 from the caddy portion 146.

The sliding conveyor assembly 172 includes a first extensible slide assembly 174 secured to the feed-in conveyor 142 for extending a sliding conveyor section 176 into alignment with the staging conveyor section 156. A support plate 178 is preferably attached to the first extensible slide assembly 174 to provide structural support for the sliding conveyor section 176, and a pneumatically controlled disc cassette retention device 180, responsive to a pneumatic cylinder 182 working in conjunction with an electronic control sensor 184 facilitates a controlled advancement of the disc cassette 144 from the sliding conveyor assembly 172 to the staging conveyor section 156.

Figure 3:
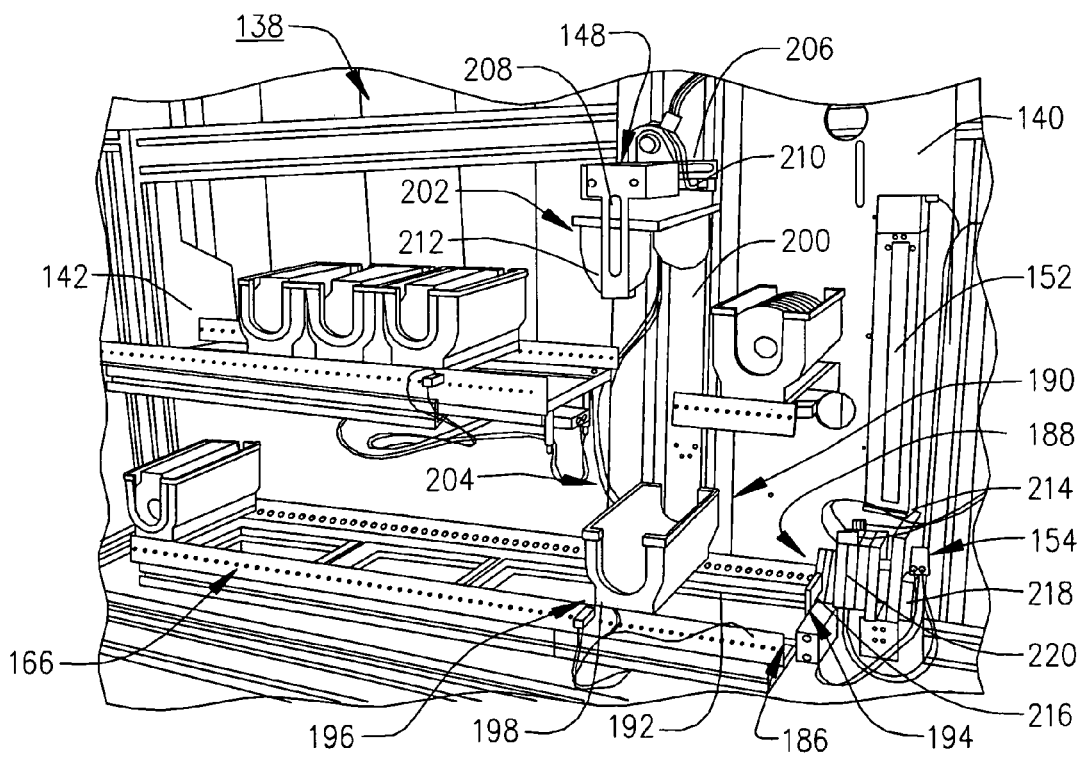
FIG. 3 is a second elevational perspective view of the disc cassette delidder and feeder system of FIG. 2.

In a preferred embodiment shown by FIG. 3, the re-lid assembly 164 (of FIG. 2) includes a second extensible slide assembly 186 secured to the proximal end 168 (of FIG. 2) of the out-feed conveyor 166 for transporting the caddy portion from a caddy release position 188, adjacent the re-lid assembly 164, to a re-lid position 190 of the out-feed conveyor 166. A support plate 192 attached to the second extensible slide assembly 186, provides structural support for transporting the caddy portion 146 from the caddy release position 188 to the re-lid position 190.

The re-lid assembly 164 preferably includes a pneumatic gripper 194, which secures the caddy portion 146 relative to the support plate 192 during transport of the caddy portion 146 between the caddy release position 188 and the re-lid position 190, while a second gating device 196, working in conjunction with an electronic caddy present sensor 198, confines the caddy portion 146 (of FIG. 2) while the lid portion 150 (of FIG. 2) is rejoined to the caddy portion 146 (of FIG. 2).

Also shown by FIG. 3, the delidder assembly 148 comprises a lid elevator 200 secured to the frame 140. The lid elevator 200 transports the lid portion 150 from a lid clearance position 202 above the feed-in conveyor 142 to a re-lid position 204 above the out-feed conveyor 166. Preferably, the delidder assembly includes a grip slide support plate 206 secured to the lid elevator 200, and sized to support the mass of the lid portion 150 during transport of the lid portion 150.

To detect presence of the lid portion 150, the delidder assembly includes a lid present electronic sensor 208 which detects presence of the lid portion 150, and a pneumatically operated linear actuating gripper slide 210 with an attached grip finger 212. The linear actuating gripper slide 210 is secured to the grip slide support plate 206 and responds to the lid present electronic sensor 208. The grip finger 212 grips the lid portion 150 during removal of the lid portion 150 from the disc cassette 144, the grip finger 212 further holds the lid portion 150 following removal of the lid portion 150 from the caddy portion 146.

The grip and rotate assembly 154 shown by FIG. 3 includes an actuator support plate 214 secured to the caddy elevator 152, which is sized to support the mass of the caddy portion 146 during rotation and indexing of the caddy portion 146. Preferably, a caddy positioned electronic sensor 216 detects presence of the caddy portion 146 within the grip and rotate assembly 154 and a linear over-travel slide 218 secured to the actuator support plate 214 precludes damage to the disc during indexing of the caddy portion 146.

A pneumatically operated rotary actuator 220 supports a grip assembly 222 (of FIG. 2), which provides a pneumatically operated holding device 224 (of FIG. 2) that constrains the caddy portion 146 relative to the rotary actuator 220 in response to the caddy positioned electronic sensor 216. Preferably, the rotary actuator 220 responds to the holding device 224, by rotating the caddy portion 146 from a substantially horizontal orientation to a substantially vertical orientation to facilitate removal of the disc.

Figure 4:
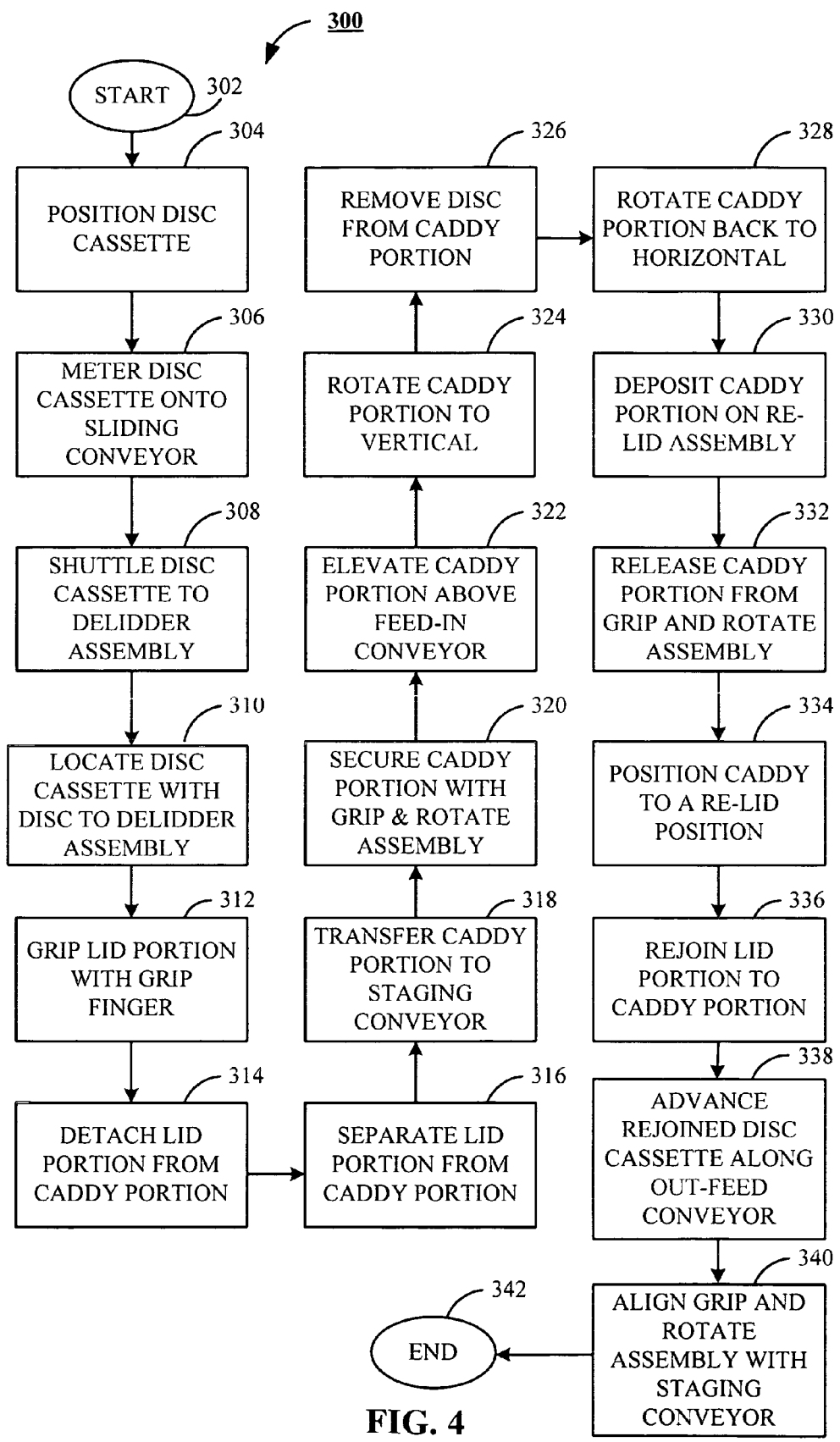
FIG. 4 is a flow diagram showing steps for using the disc cassette delidder and feeder system during the assembly process of the DSD of FIG. 1.

FIG. 4 shows a preferred disc presentation process 300 commencing at start step 302 and continuing at process step 304 by positioning a disc cassette (such as 144) on a feed-in conveyor (such as 142). At process step 306, the disc cassette is metered onto a sliding conveyor assembly (such as 172), which shuttles the disc cassette between the feed-in conveyor and the delidder assembly at process step 308. The disc cassette, with a caddy portion (such as 146) confining a disc (such as 110) is located relative to a delidder assembly (such as 148) for removal of a lid portion (such as 150) from the caddy portion of the disc cassette by the delidder assembly at process step 310.

Preferably at process step 312, the lid portion is gripped with a grip finger (such as 212) that is attached to a linear actuating gripper slide (such as 210) of the delidder assembly, and the linear actuating gripper slide is activated to detach, or uncouple the lid portion from the caddy portion at process step 314. At process step 316, the lid portion is separated from the caddy portion by displacing the lid portion from the caddy portion with a lid elevator (such as 200).

The disc presentation process 300 preferably continues at step 318, where the caddy portion is transferred to a staging conveyor section (such as 156) to await pick-up by a grip and rotate assembly (such as 154). At process step 320, the grip and rotate assembly secures the caddy portion for elevation by the lid elevator of the caddy portion above the staging conveyor section. At process step 322, in preparation for indexing of the caddy portion between opposing rails (such as 162) of the staging conveyor section, the lid elevator elevates the lid portion above the feed-in conveyor to assure noninterference between the caddy portion and the staging conveyor section.

At process step 324, in preparation for final presentation of the disc by a caddy elevator (such as 152), the caddy portion is rotated from a substantially horizontal to a substantially vertical orientation by the grip and rotate, such that the disc is presented in a final presentation position (not shown separately) through an indexing of the caddy portion by the caddy elevator.

Following removal of the disc from the caddy portion at process step 326, the caddy portion is rotated from the substantially vertical to the substantially horizontal orientation by the grip and rotate assembly at process step 328. At process step 330, the caddy portion is deposited on a re-lid assembly (such as 164), and released from the grip and rotate assembly at process step 332. And at process step 334, the caddy portion is positioned relative to a re-lid position (such as 190) of an out-feed conveyor (such as 166) by the re-lid assembly. With the caddy portion positioned relative to the re-lid position, the lid portion is rejoined with the caddy portion using the delidder assembly at process step 336, which reforms the disc cassette. And, at process step 338, the disc cassette is advanced along the out-feed conveyor, while the grip and rotate assembly is aligned adjacent the staging conveyor section at process step 340, and the preferred disc presentation process 300 concludes at end process step 342.

Accordingly, in preferred embodiments, the present invention is directed to disc presentation apparatus (such as 138), a method of presenting the disc (such as 300), and a data storage device combination (such as 100). The data storage device combination comprises a motor assembly (such as 108) rotating a disc (such as 110) into a data exchange relationship with a read/write head (such as 114), the disc presented for attachment to the motor assembly by steps (such as 300) for presenting the disc executed by means (such as 138) for presenting the disc.

The disc presentation apparatus includes a frame (such as 140) supporting a feed-in conveyor (such as 142), which advances a disc cassette (such as 144) with a caddy portion (such as 146) confining the disc. Also included in the disc presentation apparatus is a delidder assembly (such as 148) communicating with the feed-in conveyor that removes a lid portion (such as 150) of the disc cassette from the caddy portion of the disc cassette. Preferably, the frame supports a caddy elevator (such as 152), with an attached grip and rotate assembly (such as 154), which rotates the caddy portion containing the disc. The caddy elevator indexes the caddy portion of the disc cassette for presentation of the disc. Following removal of the disc, a re-lid assembly (such as 164) adjacent the caddy elevator confines the caddy portion, while the delidder assembly rejoins the lid portion to the caddy portion.

The steps of the disc presentation method preferably include; locating the disc cassette with the caddy portion confining the disc to the delidder assembly for removal of the lid portion from the caddy portion; and rotating the caddy portion with the grip and rotate assembly from a substantially horizontal to a substantially vertical orientation to facilitate an indexing of the caddy portion to a final presentation.

It is to be understood that even though numerous characteristics and advantages of various embodiments of the present invention have not been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A disc presentation apparatus comprising:
    a feed-in conveyor which advances a disc cassette comprising a caddy portion confining a disc and a lid portion;
    a delidder assembly communicating with the feed-in conveyor which removes the lid portion;
    a caddy elevator with an attached grip and rotate assembly which rotates and indexes the delidded caddy portion for presentation of the disc; and
    a re-lid assembly adjacent the caddy elevator which confines the caddy portion while the delidder assembly rejoins the lid portion to the caddy portion at a time.

2. The apparatus of claim 1, further comprising a sliding conveyor assembly communicating with the feed-in conveyor, wherein the sliding conveyor assembly shuttles the disc cassette between the feed-in conveyor and the delidder assembly.

3. The apparatus of claim 2, in which the feed-in conveyor comprises a first gating device working in tandem with an electronic sensor to facilitate advancement of not more than one disc cassette onto the sliding conveyor assembly.

4. The apparatus of claim 3, in which the first gating device comprises a pneumatically controlled disc cassette gating device responsive to a pneumatic cylinder.

5. The apparatus of claim 1, further comprising an out-feed conveyor with a proximal end communicating with the re-lid assembly, the out-feed conveyor transferring the caddy portion rejoined with the lid portion from the re-lid assembly to a distal end of the out-feed conveyor.

6. The apparatus of claim 2, further comprising a staging conveyor section communicating with the sliding conveyor assembly, the staging conveyor section supporting the disc cassette prior to engagement of the disc cassette by the grip and rotate assembly, and in which the caddy elevator selectively positions the grip and rotate assembly from a caddy clearance position above the staging conveyor section to a caddy release position adjacent the re-lid assembly, and wherein the re-lid assembly is supported by an out-feed conveyor.

7. The apparatus of claim 6, in which the sliding conveyor assembly comprises:
 a first extensible slide assembly secured to the feed-in conveyor for extending a sliding conveyor section of the sliding conveyor assembly;
 a support plate attached to the first extensible slide plate providing structural support for the sliding conveyor section; and
 a retention device working in conjunction with an electronic sensor to facilitate controlled advancement of the disc cassette from the sliding conveyor assembly to the staging conveyor section.

8. The apparatus of claim 7, in which the retention device comprises a pneumatically controlled retention device responsive to a pneumatic cylinder.

9. The apparatus of claim 6, in which the re-lid assembly comprises:
 a second extensible slide assembly secured to a proximal end of the out-feed conveyor for transporting the caddy portion from the caddy release position to a re-lid position of the out-feed conveyor;
 a support plate attached to the extensible slide assembly, the support plate providing structural support for transporting the caddy portion from the caddy release position to the re-lid position;
 a pneumatic gripper securing the caddy portion relative to the support plate during transport of the caddy portion between the caddy release position and the re-lid position; and
 a second gating device working in conjunction with an electronic sensor to confine the caddy portion while the lid portion is rejoined to the caddy portion.

10. The apparatus of claim 1, in which the delidder assembly comprises:
 a lid elevator secured to the frame, the lid elevator transports the lid portion from a lid clearance position above the feed-in conveyor to a re-lid position above an out-feed conveyor;
 a grip slide support plate secured to the lid elevator and sized to support the lid portion during transport of the lid portion;
 a lid present electronic sensor which detects presence of the lid portion; and
 a linear actuating gripper slide with an attached grip finger secured to the grip slide support plate and responsive to the lid present electronic sensor, wherein the grip finger grips the lid portion during removal of the lid portion from the disc cassette, and wherein the grip finger further holds the lid portion following the removal of the lid portion from the disc cassette.

11. The apparatus of claim 10, in which the linear actuating gripper is pneumatically operated.

12. The apparatus of claim 1, in which the grip and rotate assembly comprises:
 an actuator support plate secured to the caddy elevator and sized to support the caddy portion during rotation and indexing of the caddy portion;
 a caddy positioned electronic sensor which detects presence of the caddy portion;
 a linear over-travel slide secured to the actuator support plate precluding damage to the disc during indexing of the caddy portion; and
 a rotary actuator supporting a grip assembly, the grip assembly providing a holding device constraining the caddy portion relative to the rotary actuator in response to the caddy positioned electronic sensor sensing presence of the caddy portion, the rotary actuator rotating the caddy portion from a substantially horizontal orientation to a substantially vertical orientation, wherein access for removal of the disc is provided.

13. The apparatus of claim 12, in which the rotary actuator and the holding device are each pneumatically operated.

14. A method of presenting a disc from a disc cassette comprising a caddy portion and a lid portion by steps comprising:
 locating a disc cassette relative to a delidder assembly for removal of the lid portion; and
 rotating the caddy portion with a grip and rotate assembly from a substantially horizontal orientation to a substantially vertical orientation, wherein the grip and rotate assembly is supported by a caddy elevator, the caddy elevator indexing the caddy portion to present the disc in a final position.

15. The method of claim 14, by steps further comprising:
 transferring the caddy portion to a staging conveyor section to await pick-up by the grip and rotate assembly;
 securing the caddy portion with the grip and rotate assembly; and
 elevating the caddy portion above the staging conveyor section with the grip and rotate assembly to assure noninterference between the caddy portion and the staging conveyor section during indexing of the caddy portion between opposing rails of the staging conveyor section.

16. The method of claim 15, by steps further comprising:
 positioning a disc cassette on a feed-in conveyor;
 metering the disc cassette onto a sliding conveyor assembly from the feed-in conveyor; and
 shuttling the disc cassette between the feed-in conveyor and the delidder assembly with the sliding conveyor.

17. The method of claim 14, by steps further comprising:
 removing the disc from the caddy portion;
 rotating the caddy portion from the substantially vertical orientation to the substantially horizontal orientation with the grip and rotate assembly;
 depositing the caddy portion on a re-lid assembly;
 releasing the caddy portion from the grip and rotate assembly;
 positioning the caddy portion to a re-lid portion of an out-feed conveyor with the re-lid assembly;
 rejoining the lid portion with the caddy portion, thereby reforming the disc cassette;
 advancing the reformed disc cassette along the out-feed conveyor; and
 aligning the grip and rotate assembly with the staging conveyor section.

18. An apparatus for presenting an article within a cassette to a process, comprising:
 a grip assembly configured to grippingly engage the cassette as it is disposed in a first longitudinal plane, and rotate the cassette to a different longitudinal plane to orient the work article in the cassette at a presentation position; and a delidder assembly configured to remove a lid from the cassette before the grip assembly orients the work article, and further configured to replace the lid on the cassette after the grip assembly orients the work article.

19. The apparatus of claim 18 wherein the grip assembly is configured to index the cassette to orient each of a plurality of articles within the cassette at a common presentation position.

* * * * *